US008289412B2

(12) United States Patent
Banterle et al.

(10) Patent No.: US 8,289,412 B2
(45) Date of Patent: Oct. 16, 2012

(54) APPARATUS AND METHODS FOR BOOSTING DYNAMIC RANGE IN DIGITAL IMAGES

(75) Inventors: Francesco Banterle, Bristol (GB); Patrick Ledda, London (GB); Kurt Debattista, Bristol (GB); Alan Chalmers, Bristol (GB)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 457 days.

(21) Appl. No.: 12/516,235

(22) PCT Filed: Nov. 27, 2007

(86) PCT No.: PCT/US2007/024498
§ 371 (c)(1),
(2), (4) Date: Apr. 27, 2010

(87) PCT Pub. No.: WO2008/066840
PCT Pub. Date: Jun. 5, 2008

(65) Prior Publication Data
US 2010/0208143 A1    Aug. 19, 2010

Related U.S. Application Data

(60) Provisional application No. 60/867,325, filed on Nov. 27, 2006.

(51) Int. Cl.
*H04N 5/228* (2006.01)
*H04N 9/68* (2006.01)
*H04N 5/235* (2006.01)
*H04N 9/73* (2006.01)
*H04N 5/238* (2006.01)
*G06K 9/40* (2006.01)

(52) U.S. Cl. .......... 348/222.1; 348/234; 348/221.1; 348/223.1; 348/365; 382/274; 382/262; 382/254

(58) Field of Classification Search ............... 348/222.1, 348/223.1, 229.1, 221.1, 234, 239, 252, 353, 348/365, 603, 673, 672, 671, 678, 674, 254, 348/256, 687; 382/169, 237, 254–274
See application file for complete search history.

(56) References Cited

U.S. PATENT DOCUMENTS
5,005,419 A    4/1991    O'Donnell et al.
(Continued)

FOREIGN PATENT DOCUMENTS
EP    0933924 A2    8/1999
(Continued)

OTHER PUBLICATIONS

E. Reinhard et al., Photographic Tone Reproduction for Digital Images, ACM Trans. Graph. 21(3), pp. 267-276 (2002).*
(Continued)

*Primary Examiner* — Nhan T Tran
*Assistant Examiner* — Marly Camargo

(57) ABSTRACT

A method for increasing dynamic range of original image data representing an image comprises applying an expansion function to generate from the original image data expanded data having a dynamic range greater than that of the original image data and, obtaining an expand map comprising data indicative of a degree of luminance of regions associated with pixels in the image. The method then combines the original image data and the expanded data according to the expand map to yield enhanced image data. Apparatus for boosting the dynamic range of image data comprises a dynamic range expander that produces expanded data, a luminance analyzer that produces an expand map and a combiner that combines the original and expanded data according to a variable weighting provided by the expand map.

26 Claims, 3 Drawing Sheets

U.S. PATENT DOCUMENTS

| | | | |
|---|---|---|---|
| 5,748,797 A | 5/1998 | Sakai et al. | |
| 5,822,452 A * | 10/1998 | Tarolli et al. | 382/166 |
| 5,828,793 A * | 10/1998 | Mann | 382/284 |
| 6,418,245 B1 * | 7/2002 | Udagawa | 382/312 |
| 2005/0105115 A1 | 5/2005 | Hoshi | |
| 2006/0007502 A1 * | 1/2006 | Debevec et al. | 358/452 |

FOREIGN PATENT DOCUMENTS

GB    2319685 A1    5/1998

OTHER PUBLICATIONS

Reichmann, Michael, "Contrast Masking", http://www.luminous-landscape.com/tutorials/contrast_masking.shtml, Oct. 15, 2002.

Jen, Tzu-Cheng et al., "Image Contrast Enhancement Based on Intensity-pair Distribution", IEEE International Conference on Image Processing, 2005.

Sakaue, Shigeo et al., "Adaptive Gamma Processing of the Video Cameras for the Expansion of the Dynamic Range", IEEE Transactions on Consumer Electronics, vol. 41, issue 3, pp. 555-562, 1995.

Reinhard, et al., "Photographic tone reproduction for digital images", ACM Trans. Graph., 21(3):267-276 (2002).

Smith, et al., "Beyond tone mapping: Enhanced depiction of tone mapped HDR images", Computer Graphics Forum 25(3) (2006).

Ledda, et al., "Evaluation of tone mapping operators using a high dynamic range display", ACM Trans. Graph., 24(3):640-648 (2005).

Debevec, P., "A median cut algorithm for light probe sampling", ACM Siggraph 2005 posters (2005).

* cited by examiner

APPARATUS AND METHODS FOR
BOOSTING DYNAMIC RANGE IN DIGITAL
IMAGES

CROSS REFERENCE TO RELATED APPLICATION

This application claims the benefit of U.S. Provisional Application Ser. No. 60/867,325 filed Nov. 27, 2006 and entitled APPARATUS AND METHODS FOR BOOSTING DYNAMIC RANGE IN DIGITAL IMAGES which is hereby incorporated herein by reference in its entirety.

TECHNICAL FIELD

This invention relates to digital imaging. The invention relates specifically to methods and apparatus for increasing the dynamic range of digital images.

BACKGROUND

The human eye is sensitive light over a very wide range of intensities. Images must have high dynamic ranges to accurately reproduce real scenes. High-performance image sensors, such as high-performance CCD arrays are capable of acquiring images having high dynamic ranges. There are displays, such as the displays available from Dolby Canada Corporation are capable of displaying high dynamic range images. However, many computer displays, televisions and the like have limited dynamic ranges and are incapable of displaying such high dynamic range images.

Some image data has low dynamic range because of the way that the image data is acquired or generated. In other cases, the dynamic range of image data may be reduced to match the characteristics of displays on which image of the image data will be reproduced. A tone mapping operator can be applied to higher dynamic range image data to reduce the dynamic range of the image data. This may be done, for example, to provide image data that matches the dynamic range of a type of display or a particular image data format.

There is a vast amount of existing image data that has a dynamic range that is lower than the dynamic range that can be displayed by available high dynamic range displays and/or appreciated by the human eye.

There is a need for methods and apparatus that can boost the dynamic range of lower dynamic range image data.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for increasing the dynamic range of original image data representing an image. The method comprises, in any order: applying an expansion function to generate from the original image data expanded data having a dynamic range greater than that of the original image data; and, obtaining an expand map comprising data indicative of a degree of luminance of regions associated with pixels in the image. The method combines the original image data and the expanded data according to the expand map to yield enhanced image data.

Another aspect of the invention provides apparatus for expanding the dynamic range of original image data. The apparatus comprises: a dynamic range expander connected to receive original image data and to output expanded data having a dynamic range greater than that of the original image data; a luminance distribution analyzer configured to generate an expand map indicative of the luminance of regions associated with pixels in the image of the original image data; and an image combiner configured to combine the original image data with the expanded data from the dynamic range expander according to the expand map to yield enhanced image data.

Another aspect of the invention provides a method for enhancing the dynamic range of original image data, the method comprising processing luminance values for pixels of the original image data according to the inverse tone mapping operator given by:

$$\frac{\alpha^2}{L_{white}^2 \overline{L}_w^2} L_w^2(x,y) + \frac{\alpha}{\overline{L}_w}(1 - L_d(x,y))L_w(x,y) - L_d(x,y) = 0$$

or a mathematical equivalent thereof, where $\alpha$, $L_{white}$, and $\overline{L}_w$ are parameters and $L_d$ is a luminance value corresponding to a pixel in the original image data.

In addition to the exemplary aspects and embodiments described above, further aspects and embodiments are described below and/or will become apparent by reference to the drawings and by study of the following detailed description.

BRIEF DESCRIPTION OF DRAWINGS

The appended drawings which illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

This invention provides methods and apparatus for boosting the dynamic range of image data. The methods and apparatus may be applied, for example, to increase the dynamic range of legacy images (which may be still or video images, for example) for display on high dynamic range displays.

Figure 1:
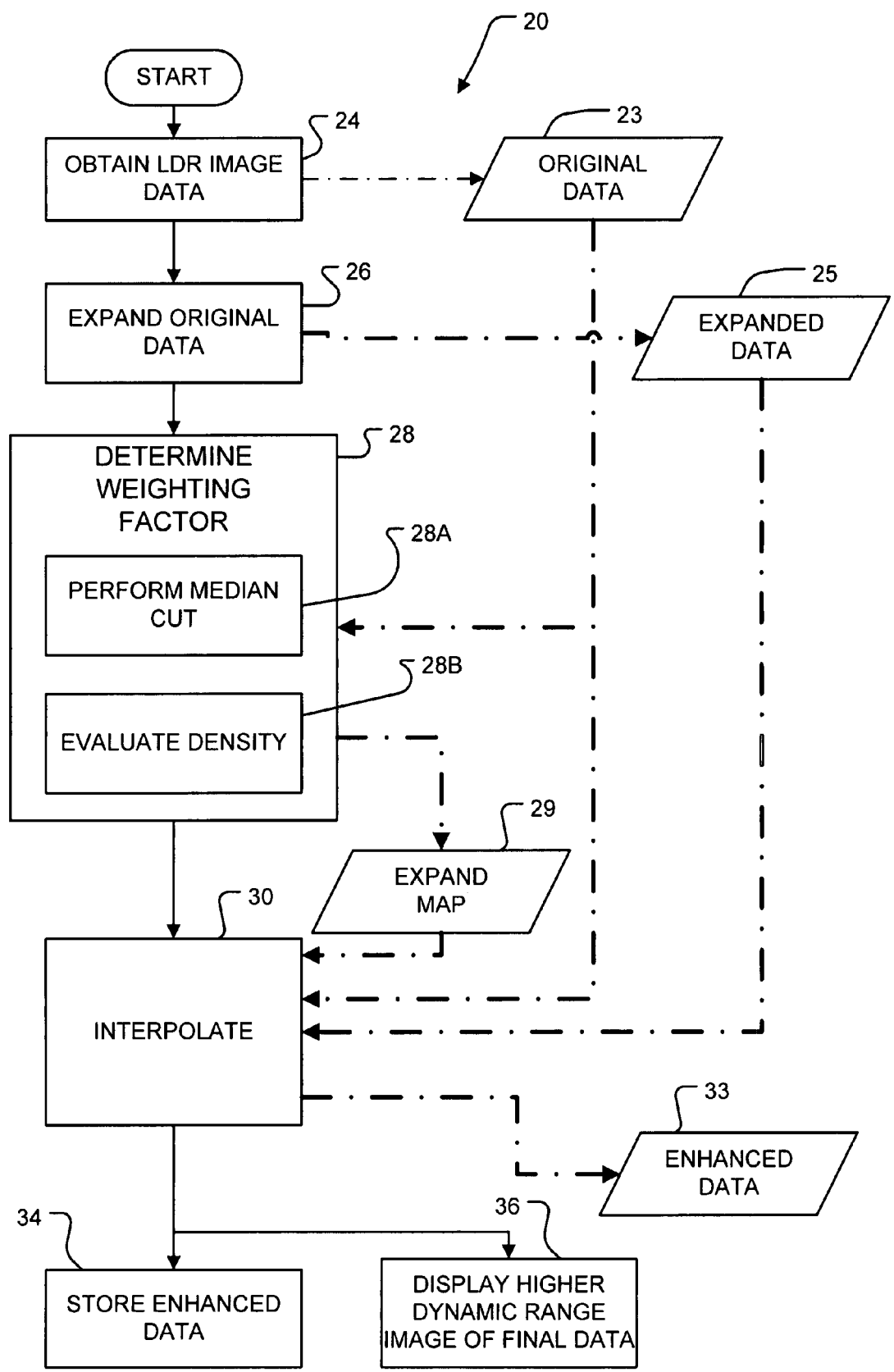
FIG. 1 is a flow chart illustrating a method according to an embodiment of the invention.

FIG. 1 shows a method 20 according to an embodiment of the invention. Method 20 acts on original image data 23 obtained in block 24 to expand the dynamic range of the image data 23. In block 26, method 20 expands original image data 23 to obtain expanded image data 25. Expanding maps pixel luminosity values from a first range to a second range. The second range provides more possible values than the first range. For example, the first range may permit values in the range of 0 to 255 while the second, expanded, range may permit values in the range of 0 to 1023 or values in the range of 0.00 to 1.00 to some specified precision. In some embodiments, the luminosity value of a pixel in expanded image data 25 is a function of the luminosity value of the corresponding pixel in original image data 23.

Expanding may involve any of: linear scaling, non-linear scaling or applying a more complicated expansion function such as the inverse of a tone mapping function. Where block 26 applies an inverse tone-mapping function, the inverse tone-mapping function applied in block 26 is not necessarily the inverse of any particular tone mapping function used in the creation of original image data 23. Indeed, in some cases, original image data 23 may have been obtained without the application of a tone mapping function or through the application of a tone mapping function different from the inverse of the tone mapping function applied in block 26.

One example tone mapping function is the *Photographic Tone Reproduction* described in Reinhard et al., *Photographic tone reproduction for digital images*, ACM Trans. Graph., 21, 3, 267-276 (2002). Other tone mapping functions are described, for example, in Smith et al, *Beyond tone mapping: Enhanced depiction of tone mapped HDR images.*, Computer Graphics Forum 25, 3 (2006); and Ledda et al. *Evaluation of tone mapping operators using a high dynamic range display*, ACM Trans. Graph., 24, 3, 640-648 (2005).

The photographic tone reduction tone mapping operator scales pixel luminosity values based on a geometric average, which is or approximates the key of the scene and then compresses the resulting values. The scaling may be given by:

$$L_m(x, y) = \frac{\alpha}{\bar{L}_w} L_w(x, y) \quad (1)$$

where $L_m$ is the scaled value, $\alpha$ is a user parameter, $L_w$ is the luminosity of the pixel in original image data 23. If original image data 23 is in an RGB format then $L_w$, may be given by:

$$L_w = 0.213 R_w + 0.715 G_w + 0.072 B_w \quad (2)$$

where $R_w$, $G_w$ and $B_w$ are respectively the red, green and blue pixel values for the pixel in the RGB color space. $\bar{L}_w$ is the geometric average defined by:

$$\bar{L}_w = \exp\left(\frac{1}{N} \sum_{x,y} \log(\delta + L_w(x, y))\right) \quad (3)$$

where δ is a small non-negative value and N is a number of pixels in the image.

The compression maybe provided by a function which takes input values within a first range and produces output values within a second, narrower range. For example, compression could be provided by:

$$L_d(x, y) = \frac{L_m(x, y)}{1 + L_m(x, y)} \quad (4)$$

where $L_d$ is the compressed value for the pixel at (x, y). In a more flexible embodiment, the compression is provided by:

$$L_d(x, y) = \frac{L_m(x, y)\left(1 + \frac{L_m(x,y)}{L_{white}^2}\right)}{1 + L_m(x, y)} \quad (5)$$

where $L_{white}$ is a parameter that corresponds to the smallest luminance value from the uncompressed data that will be mapped to white in the compressed data.

Equation (5) can be inverted by solving the quadratic equation:

$$\frac{L_m^2(x, y)}{L_{white}^2} + L_m(x, y)(1 - L_d(x, y)) - L_d(x, y) = 0 \quad (6)$$

In Equation (5), $L_m$ can be replaced by the value from Equation (1) to yield:

$$\frac{\alpha^2}{L_{white}^2 \bar{L}_w^2} L_w^2(x, y) + \frac{\alpha}{\bar{L}_w}(1 - L_d(x, y))L_w(x, y) - L_d(x, y) = 0 \quad (7)$$

Equation (7) can be solved for $L_w$ using the quadratic formula to obtain the largest positive-valued solution. This can be performed for each pixel in an image to obtain expanded image data 25.

To apply the solution of Equation (7) for inverse tone-mapping one must assign values to the parameters $\alpha$, $L_{white}$, $L_d$ and the geometric average $\bar{L}_w$. Unless one knows what tone-mapping operator (if any) was applied to obtain the lower dynamic range image being worked on, these parameters will not be known. In methods according to some embodiments, a user may set values for these parameters. In some embodiments, the parameters may be automatically set or predetermined. In some embodiments, some or all of the parameters are set automatically to initial values and a user can vary the parameter values from those initial values, if desired.

One way to assign $\bar{L}_w$ is to use the geometric average luminance of the lower dynamic range image being processed. It has been found that the geometric average luminance of a higher- and lower-dynamic range images of the same scene are typically quite similar (unless the lower-dynamic-range image is significantly over- or under-exposed). Certain tone-mapping operators tend to change the geometric average luminance. Where such tone mapping operators have been used in the generation of original image data 23 it may be desirable to use a function of the geometric average luminance of the lower dynamic range image being processed for $\bar{L}_w$. The function may be chosen based upon knowledge of the tone-mapping operator used to generate original image data 23 or may be determined empirically.

One way to assign a value to the parameter $L_d(x,y)$ is to realize that $L_d$ is the luminance of the lower-dynamic range image being processed.

The parameters $\alpha$ and $L_{white}$ may be set by the user. The meaning of the parameter $\alpha$ is somewhat enigmatic. Therefore, the inventors prefer to define a parameter $L_{max}'$ such that:

$$L_{max}' = \frac{L_{white} \bar{L}_w}{\alpha} \quad (8)$$

$L_{max}'$ is the maximum luminance value expected in the inverse tone-mapped image. $L_{white}$ affects the expansion of the original low- and medium-luminance values. If $L_{white}$ is very high, those values are mapped to very low luminance values. If $L_{white}$ is very low, the inverse-tone-mapped image will have luminance values similar to those in the original lower-dynamic range image scaled by the factor $L_{max}{'}$. In typical applications, setting $L_{white}$ and $L_{max}{'}$ to have values that are equal or of the same order tends to produce reasonable results.

The expansion function applied in block 26 may produce an expanded image that is not completely acceptable. If the expansion function produces output luminance values that are high then the resulting image may be "blocky" in appearance.

Method 20 obtains an output image 33 by combining expanded image 25 with original image 23 according to an expand map 29 generated in block 28. Expand map 29 identifies higher-luminance and lower-luminance areas of original image 23. Using expand map 29, method 20 bases output image 33 more heavily on expanded image 25 in higher-luminance areas and bases output image 33 more heavily on original image 23 in lower-luminance areas. Block 28 may use any suitable method for evaluating the luminance level of an area to which a pixel belongs. For example, block 28 may compute an average luminance or weighted average luminance of pixels in an area to which each pixel belongs. Expand map 29 includes weights associated with each pixel. The weights indicate the relative degree to which original image 23 and expanded image 25 contribute to the value for that pixel in enhanced image 33.

In the illustrated embodiment, block 28 applies a median cut algorithm in block 28A. The median cut algorithm is described, for example, in Debevec, P., *A median cut algorithm for light probe sampling*, ACM Siggraph 2005 posters (2005). The median cut algorithm identifies a set of point light sources that are clustered near areas of high luminance in an image. The number and intensity of such light sources in the vicinity of a pixel is used to create expand map 29 in some embodiments.

The median cut algorithm divides an image into $2^n$ regions of similar light energy. These areas may be identified by subdividing the image along the longest dimension such that the luminance is equally apportioned between the resulting regions. The process is repeated for the resulting regions. A light source is placed at the centroid of each of the $2^n$ regions obtained by iterating the process of dividing the image into regions n times. The colour of each light source is set to an average value across the region (for example, the colour may be set to equal a sum of pixel values within the region.

In some embodiments of the invention n is at least 9 (corresponding to 512 light sources). In some embodiments n is 10 or more.

In some implementations, the point light sources may be stored in a data structure comprising a 2D tree to facilitate nearest-neighbour searches that may be performed in creation of expand map 29.

It is not mandatory that the original image 23 be used for identification of higher- and lower-luminance areas. The distribution of higher- and lower-luminance areas will be similar in original image data 23 and expanded image data 25. The median cut algorithm may be performed on expanded image data 25.

One way to obtain a set of weights from the light-sources identified by the median cut algorithm performed in block 28A is to determine for each pixel (x,y) the density of light sources within an area surrounding the pixel. The area may conveniently comprise a circular area having some radius r for example. Other area shapes could also be used. Density estimation is described in Duda et al. *Pattern Classification* $2^{nd}$ *Edition*, Wiley Interscience (2001).

A basic formula that may be used for density estimation is:

$$\Lambda(X, r) = \frac{\sum_{p \in P} \Psi_p}{\pi r_{max}^2} \tag{9}$$

where: $\Lambda$ is the density; X is the location (x.y) in the image; $\Psi_p$ is the luminance value for a light source at point p; and, P is the set of points within the area (a circle having radius r and centered at X in this example) that correspond to light sources identified by the median cut algorithm. r The density estimation can be improved in a number of ways including:
  iterating the median cut algorithm to obtain a greater number of light sources (i.e. making n larger);
  applying a smoothing filter to the results of the density estimation;
  requiring that at least a threshold number of light sources (for example, where there are 1024 or more light sources—n=10 the threshold number could be 4 or more—in some cases 4-6 light sources) be within a region of influence of a pixel (e.g. within a radius r of the pixel) before assigning a non-zero density $\Lambda$ to the pixel.

A smoothing filter may comprise a Gaussian smoothing filter. For example, a prototype embodiment applied a Gaussian filter defined by the weight of the kernel given by:

$$w_g^p = \gamma \left[ 1 - \frac{1 - e^{-\beta \frac{r_p^2}{2r_{max}^2}}}{1 - e^{-\beta}} \right] \tag{10}$$

where: $w_g^p$ is the kernel; $\gamma$ and $\beta$ are parameters. This filter is described, for example in Pavicic, *Convenient Anti-Aliasing Filters that Minimize Bumpy Sampling*, Morgan Kaufmann, (1990). Example values for $\gamma$ and $\beta$ are $\gamma=0.918$ and $\beta=1.953$. This filter is normalized and can be applied by scaling the luminances by $w_g^p$ when computing the density estimation as described above. It can be seen that this filter weights light sources that are closer to the pixel more deavily than light sources that are farther from the pixel.

In block 30, original data 23 and expanded data 25 are combined using expand map 29 to yield enhanced data 33. In an illustrative example, expand map 29 provides a value in the range [0,1] for each pixel. This value can be used as weights for a linear interpolation between original data 23 and expanded data 25. For example:

$$L_{final}(x,y) = \Lambda(x,y) L_w(x,y) + (1 - \Lambda)(x,y) L_d(x,y) \tag{11}$$

where: $L_{final}$ is a pixel luminance value in enhanced data 33 for a pixel at location (x,y); $L_w$ is a luminance value for the pixel in expanded data 25; $L_d$ is a luminance value for the pixel in original data 23; and $\Lambda$ is a weight for the pixel in the range [0,1] from expand map 29.

Block 30 could optionally combine original data 23 and expanded data 25 in other ways. For example, the interpolation could be non-linear.

The methods described herein may be applied to enhance the dynamic range of digital still images or video images, for example. Enhanced data 33 may be saved, as indicated in block 34 or displayed on a display, as indicated in block 36.

The inverse tone mapping operator described above with reference to Equations (6) and (7) has application outside of method 20. For example, the inverse tone mapping operator could be applied directly to increase the dynamic range of frames in a video. In such embodiments, the image of each frame of the video may be processed by the inverse tone mapping operator to obtain an expanded frame. The expanded frames may be stored and/or played back to provide video having a dynamic range higher than that of the original video.

Typical images contain hundreds of thousands of pixels and, more typically, millions of pixels. The methods described herein are performed using automated apparatus, such as specialized hardware and/or programmed computer systems.

Figure 2:
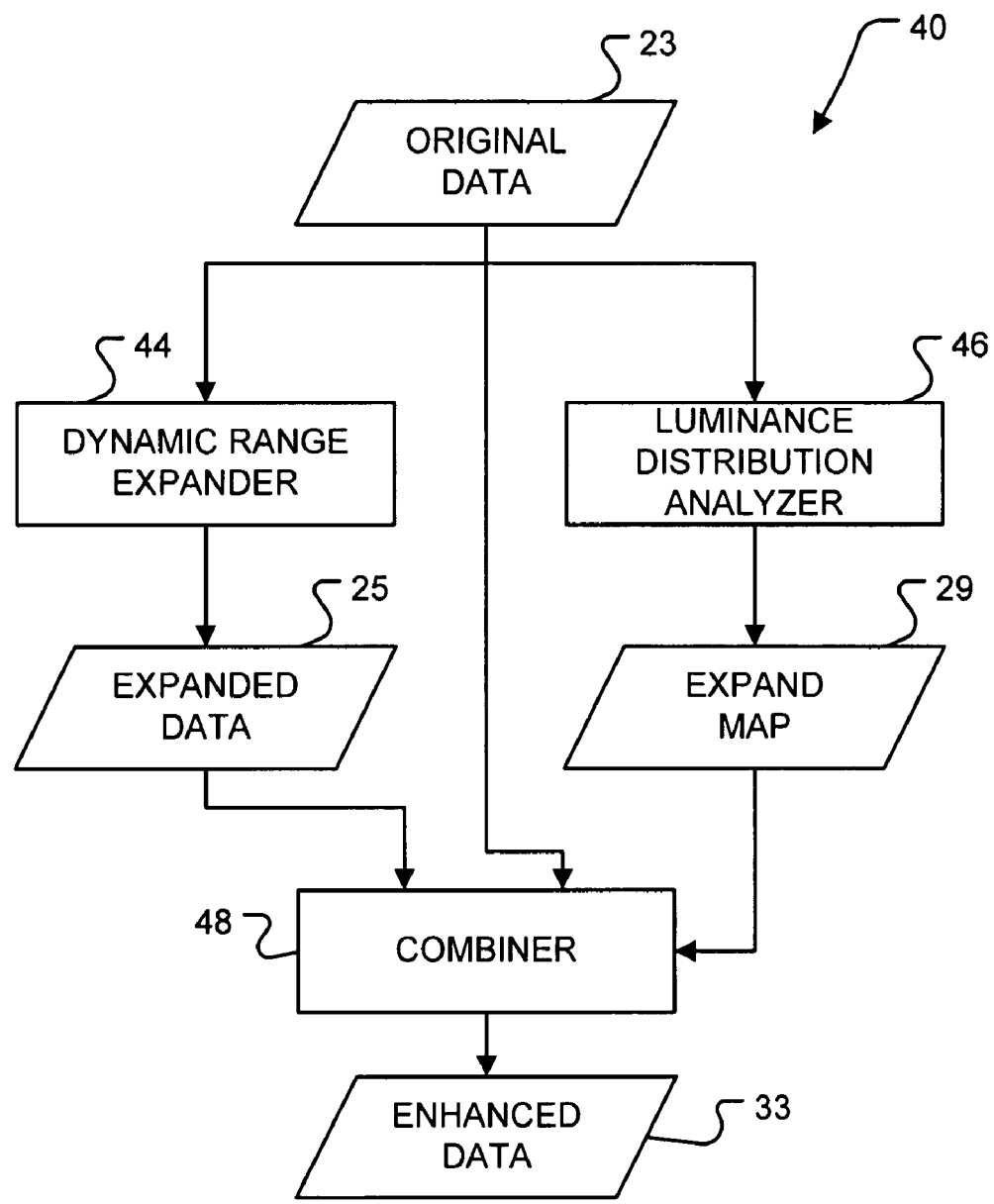
FIG. 2 is a block diagram of an apparatus according to the invention.

FIG. 2 shows schematically apparatus 40 for producing images having expanded dynamic ranges from original image data 23.

Apparatus 40 comprises a dynamic range expander 44 that processes original image data 23 to yield expanded data 25. In some embodiments, dynamic range expander 44 comprises a software module that takes original image data 23 and applies a dynamic range expansion function to each luminance value in original image data 23 to yield expanded data 25.

Apparatus 40 comprises a luminance distribution analyzer 46 that processes original image data 23 (or optionally expanded data 25) to yield expand map 29. Luminance distribution analyzer 46 determines the degree to which pixels in the original image data 23 belong to high-luminance and low-luminance areas of the image represented by original image data 23.

Combiner 48 combines original image data 23 and expanded data 25 to yield enhanced data 33. The relative degree to which each pixel of enhanced data 33 is based upon the value for the corresponding pixel of original image data 23 and expanded data 25 depends upon the value of the corresponding pixel in expand map 29.

Each of dynamic range expander 44, luminance distribution analyzer 46 and combiner 48 may comprise a hardware module, a combination of hardware and software, or configurable hardware, such as one or more suitably configured field-programmable gate arrays (FPGAs). In some embodiments, apparatus 40 is provided in a high dynamic range electronic display system capable of displaying still and/or video images. In such embodiments, apparatus 40 may be activated to enhance legacy images and/or video images having dynamic ranges lower than a dynamic range that the display system is capable of reproducing.

Figure 3:
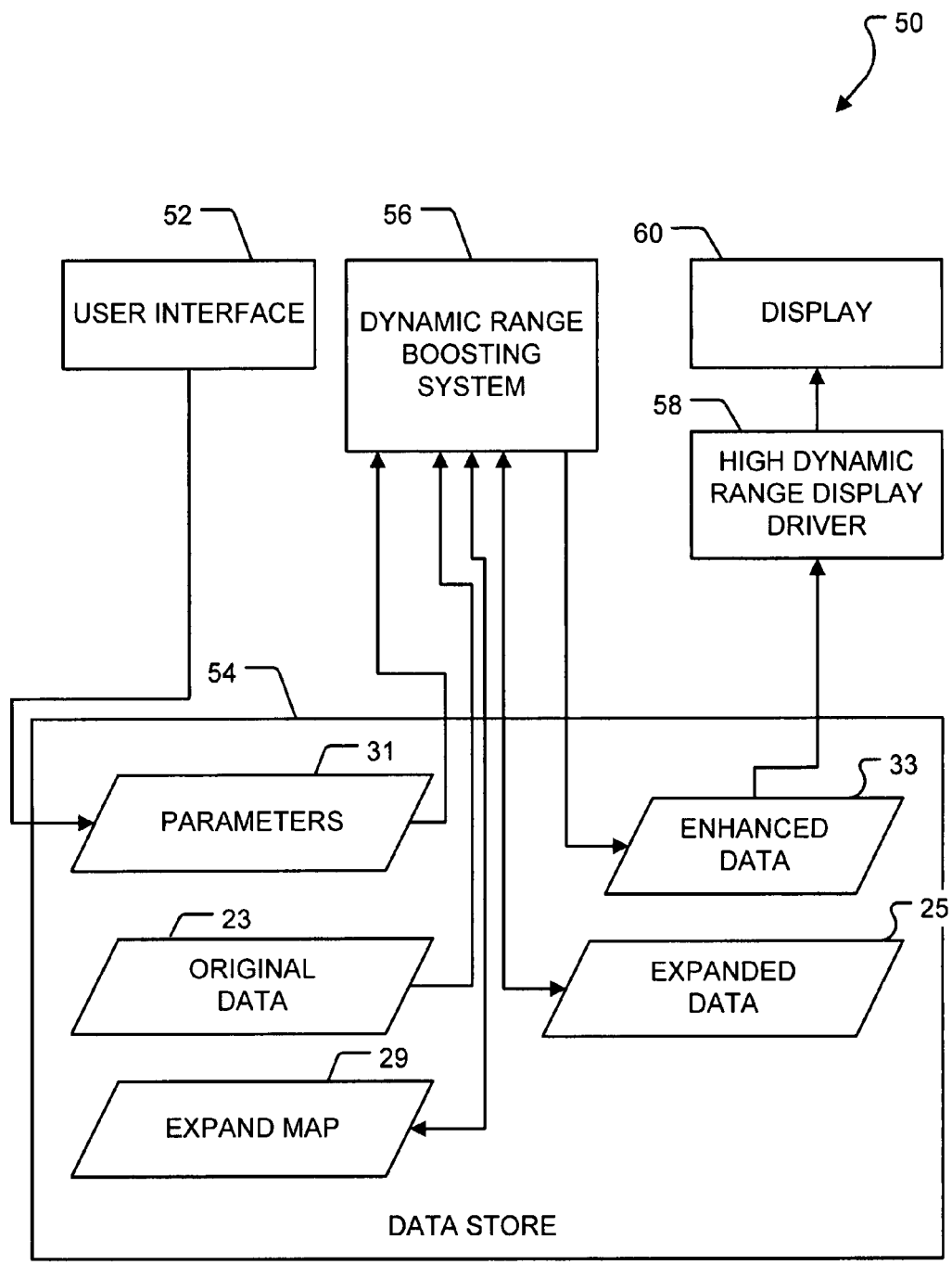
FIG. 3 is a block diagram of an apparatus according to another embodiment of the invention.

FIG. 3 illustrates apparatus 50 according to another embodiment of the invention. Apparatus 50 has a user interface 52 which permits a user to control values of parameters 31 in a data store 54. Parameters 31 control the operation of a dynamic range boosting system 56 that processes original image data 23 to obtain enhanced image data 33 as described herein. Enhanced image data 33 is displayed on a display 60 controlled by a high dynamic range display driver 58. In the illustrated embodiment, a user can view the effect of a particular set of parameters 31 on the image displayed on display 60 and then alter the values of one or more parameters 31 by way of user interface 52 to achieve a desired appearance of the image. The user can then save the enhanced image data 33 for later display on display 60 or on other high dynamic range displays.

Certain implementations of the invention comprise computer processors which execute software instructions which cause the processors to perform a method of the invention. For example, one or more processors in an image-processing or image display system may implement the methods of FIG. 1 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. For example:

Application of the invention is not limited to any particular formats for representing image data or to any particular colour spaces. Although luminance values are processed, it is not necessary that the original image data 23 or the enhanced image data 33 be in a LUV or other format in which luminance values are explicitly represented. The invention can be practiced with other image formats that contain information from which luminance values can be derived. For example, where image data is represented in a RGB format, luminance values can be derived through the application of Equation (2) or other suitable relationship which produces a value related to luminance from values for individual colours in the image.

It is therefore intended that the following appended claims and claims hereafter introduced are interpreted to include all such modifications, permutations, additions and sub-combinations as are within their true spirit and scope.

What is claimed is:

1. A method, performed by one or more processors, for increasing dynamic range of original image data representing an image, the method comprising:

applying, by the one or more processors, an expansion function to generate, from the original image data, expanded data having a dynamic range greater than that of the original image data;

obtaining, by the one or more processors, an expand map comprising data indicative of a degree of luminance of regions within the image and associated with pixels in the image, wherein obtaining the expand map comprises processing at least one of the original image data and the expanded data to thereby obtain the expand map data and wherein, for each region within the image, the degree of luminance of the region indicated by the expand map data is based on values of a plurality of pixels in the region; and, combining, by the one or more processors, the original image data and the expanded data according to the expand map to yield enhanced image data.

2. A method according to claim 1 wherein obtaining the expand map comprises performing a median cut algorithm on data representing the image.

3. A method according to claim 2 wherein the data representing the image comprises the original image data.

4. A method according to claim 2 wherein the data representing the image comprises the expanded data.

5. A method according to claim 2 wherein obtaining the expand map comprises estimating a density of light sources identified by the median cut algorithm in the regions associated with the pixels.

6. A method according to claim 5 wherein the regions associated with the pixels comprise circular regions centered on the pixels.

7. A method according to claim 6 wherein the circular regions have radii in the range of 10 to 20 pixels.

8. A method according to claim 5 wherein estimating the density comprises weighting the light sources according to a smoothing function.

9. A method, performed by one or more processors, for increasing dynamic range of original image data representing an image, the method comprising:
   applying, by the one or more processors, an expansion function to generate, from the original image data, expanded data having a dynamic range greater than that of the original image data;
   obtaining, by the one or more processors, an expand map comprising data indicative of a degree of luminance of regions associated with pixels in the image, wherein obtaining the expand map comprises processing at least one of the original image data and the expanded data; and,
   combining, by the one or more processors, the original image data and the expanded data according to the expand map to yield enhanced image data;
   wherein obtaining the expand map comprises performing a median cut algorithm on data representing the image;
   wherein obtaining the expand map comprises estimating a density of light sources identified by the median cut algorithm in the regions associated with the pixels;
   wherein estimating the density comprises weighting the light sources according to a smoothing function; and
   wherein the smoothing function comprises computing an exponential of a negative value that is a function of a distance of the light source from the pixel.

10. A method, performed by one or more processors, for increasing dynamic range of original image data representing an image, the method comprising:
    applying, by the one or more processors, an expansion function to generate, from the original image data, expanded data having a dynamic range greater than that of the original image data;
    obtaining, by the one or more processors, an expand map comprising data indicative of a degree of luminance of regions associated with pixels in the image, wherein obtaining the expand map comprises processing at least one of the original image data and the expanded data; and,
    combining, by the one or more processors, the original image data and the expanded data according to the expand map to yield enhanced image data;
    wherein obtaining the expand map comprises performing a median cut algorithm on data representing the image;
    wherein obtaining the expand map comprises estimating a density of light sources identified by the median cut algorithm in the regions associated with the pixels; and
    wherein estimating the density for a pixel comprises weighting the light sources according to their distance from the pixel with light sources closer to the pixel weighed more heavily than light sources further from the pixel.

11. A method according to claim 2 comprising performing the median cut algorithm to obtain at least $2^n$ light sources wherein n is at least 9.

12. A method according to claim 11 comprising setting a pixel value in the expand map to a predetermined value if there are not at least a threshold number of light sources in the region associated with the pixel.

13. A method according to claim 12 wherein the threshold is at least 4.

14. A method according to claim 13 wherein the threshold is in the range of 4 to 6.

15. A method, performed by one or more processors, for increasing dynamic range of original image data representing an image, the method comprising:
    applying, by the one or more processors, an expansion function to generate, from the original image data, expanded data having a dynamic range greater than that of the original image data;
    obtaining, by the one or more processors, an expand map comprising data indicative of a degree of luminance of regions associated with pixels in the image, wherein obtaining the expand map comprises processing at least one of the original image data and the expanded data; and,
    combining, by the one or more processors, the original image data and the expanded data according to the expand map to yield enhanced image data;
    wherein applying the expansion function comprises applying an inverse tone-mapping operator.

16. A method according to claim 1 wherein applying the expansion function comprises linear scaling pixel luminosity values of the original image data.

17. A method according to claim 1 wherein applying the expansion function comprises non-linear scaling pixel luminosity values of the original image data.

18. A method, performed by one or more processors, for increasing dynamic range of original image data representing an image, the method comprising:
    applying, by the one or more processors, an expansion function to generate, from the original image data, expanded data having a dynamic range greater than that of the original image data;
    obtaining, by the one or more processors, an expand map comprising data indicative of a degree of luminance of regions associated with pixels in the image, wherein obtaining the expand map comprises processing at least one of the original image data and the expanded data; and,
    combining, by the one or more processors, the original image data and the expanded data according to the expand map to yield enhanced image data;
    wherein applying the expansion function comprises solving for $L_w$ in the quadratic equation:

$$\frac{\alpha^2}{L_{white}^2 \overline{L}_w^2} L_w^2(x, y) + \frac{\alpha}{\overline{L}_w}(1 - L_d(x, y))L_w(x, y) - L_d(x, y) = 0$$

or a mathematical equivalent thereof, where $\alpha$, $L_{white}$, and $\overline{L}_w$ are parameters and $L_d$ is a luminance value corresponding to a pixel in the original image data.

19. A method according to claim 18 comprising setting $\overline{L}_w$ equal to a geometric average luminance of the original image data.

20. A method according to claim 18 comprising setting $\overline{L}_w$ and $L_{white}$ to have values that are of the same order of magnitude.

21. A method according to claim 1 wherein combining the original image data and the expanded data comprises computing weighted averages of pixel luminance values of the original image data and expanded data with weighting values determined from the expand map.

22. A method according to claim 1 wherein combining the original image data and the expanded data comprises interpolating pixel luminance values of the original image data and expanded data with weighting values determined from the expand map.

23. Apparatus for expanding the dynamic range of original image data representing an image, the apparatus comprising:
a dynamic range expander connected to receive the original image data and configured to use the original image data to generate and output expanded data having a dynamic range greater than that of the original image data;
a luminance distribution analyzer configured to use at least one of the original image data and the expanded data to generate an expand map comprising data indicative of a degree of luminance of regions within the image and associated with pixels in the image, and wherein, for each region within the image, the degree of luminance of the region indicated by the expand map data is based on values of a plurality of pixels in the region;
an image combiner configured to combine the original image data with the expanded data according to the expand map to yield enhanced image data.

24. Apparatus according to claim 23 wherein the luminance distribution analyzer is configured to perform a median cut algorithm.

25. Apparatus according to claim 24 wherein the luminance distribution analyzer is configured to generate at least 512 light sources by applying the median cut algorithm.

26. A method, performed by one or more processors, for enhancing the dynamic range of original image data, the method comprising processing, by the one or more processors, luminance values for pixels of the original image data according to an inverse tone mapping operator given by:

$$\frac{\alpha^2}{L_{white}^2 \overline{L}_w^2} L_w^2(x, y) + \frac{\alpha}{\overline{L}_w}(1 - L_d(x, y))L_w(x, y) - L_d(x, y) = 0$$

or a mathematical equivalent thereof, where $\alpha$, $L_{white}$, and $\overline{L}_w$ are parameters and $L_d$ is a luminance value corresponding to a pixel in the original image data.

* * * * *